United States Patent [19]

Zones

[11] Patent Number: 4,689,207

[45] Date of Patent: Aug. 25, 1987

[54] PROCESS FOR THE PREPARATION OF CRYSTALLINE MICROPOROUS ORGANOSILICATES USING MAGADIITE AS A SILICA SOURCE

[75] Inventor: Stacey I. Zones, San Francisco, Calif.

[73] Assignee: Chevron Research Company, San Francisco, Calif.

[21] Appl. No.: 708,629

[22] Filed: Mar. 6, 1985

[51] Int. Cl.$^4$ .............................................. C01B 33/32
[52] U.S. Cl. .................................... 423/332; 423/328; 423/329; 423/335; 423/339; 502/60; 502/62; 502/77; 502/232
[58] Field of Search ............... 423/332, 335, 339, 333, 423/328 T, 329 T; 502/60, 62, 77, 232

[56] References Cited

U.S. PATENT DOCUMENTS

| | | |
|---|---|---|
| Re. 29,857 | 12/1978 | Argauer et al. .................... 208/120 |
| 3,306,922 | 2/1967 | Barrer et al. .................... 423/328 T |
| 3,947,482 | 3/1976 | Albers et al. .................... 423/328 T |
| 4,061,724 | 12/1977 | Grose et al. .................... 423/335 |
| 4,073,865 | 2/1978 | Flanigen et al. .................... 423/335 |
| 4,100,262 | 7/1978 | Pelrine .................... 423/328 T |
| 4,104,294 | 8/1978 | Grose et al. .................... 423/335 |
| 4,410,637 | 10/1983 | Kortbeek et al. .................... 502/257 |
| 4,462,971 | 7/1984 | Hinnenkamp et al. .................... 423/332 |
| 4,531,012 | 7/1985 | Valyocsik .................... 423/328 T |
| 4,626,421 | 12/1986 | Zones .................... 423/326 |
| 4,627,968 | 12/1986 | Kai .................... 423/329 |

FOREIGN PATENT DOCUMENTS 5152998 11/1974 Japan .
0023497 8/1983 United Kingdom .
2125390 3/1984 United Kingdom .

Primary Examiner—John Doll
Assistant Examiner—Jackson Leeds
Attorney, Agent, or Firm—S. R. LaPaglia; T. G. DeJonghe; V. J. Cavalieri

[57] ABSTRACT

All silica zeolites are prepared using magadiite as a source of silica.

11 Claims, No Drawings

PROCESS FOR THE PREPARATION OF CRYSTALLINE MICROPOROUS ORGANOSILICATES USING MAGADIITE AS A SILICA SOURCE

BACKGROUND OF THE INVENTION

1. Field of the Invention

This invention relates to a method for synthesizing crystalline organosilicate zeolites requiring a reaction mixture for crystallization thereof which contains magadiite as a source of silicon oxide.

2. Description of the Prior Art

Natural and synthetic zeolitic materials of the molecular sieve type are known and are staple items of commerce. High silica zeolites are extremely well known in the art and have been the subject of much attention in both the patent and technical literature. These materials have been demonstrated to have catalytic properties for various types of hydrocarbon conversions.

As a group, these highly siliceous materials are exemplified by U.S. Pat. Nos. 3,941,871; 4,061,724; 4,073,865; 4,104,294; 4,456,582; wherein the materials are prepared from reaction solutions which involve no deliberate addition of aluminum. However, trace quantities of aluminum are usually present due to the impurity of the reactants.

As is set forth in the above-identified U.S. patents which are incorporated totally herein by reference, these types of zeolites are prepared from a forming solution containing water, a source of quaternary ammonium cations, an alkali metal, a source of silica, with or without added alumina and with or without the presence of additional metals. As is known in the art, the forming solution is held at elevated temperatures and pressures until the crystals are formed and thereafter the zeolite crystals are removed.

Prior art sources of silica in preparing zeolites include sodium silicate, colloidal silica, silica hydrosol, silica gel and silicic acid.

A considerable amount of effort has been made to find cheaper routes to zeolites and to find ways to prepare purer forms of the zeolites, i.e., to reduce the quantities of aluminum present as impurities.

It has now been found that magadiite in its alkali metal form or in the hydrogen form, especially when made synthetically, is a particularly attractive source of silica as it enables useful zeolites to be prepared cheaply, easily and in a more purer form.

SUMMARY OF THE INVENTION

The present invention is directed to a method of preparing crystalline microporous organosilicates which comprises preparing an aluminum free reaction mixture containing as a source of silica oxide an aluminum free magadiite or hydrogen form of magadiite, an alkali metal oxide, a quaternary organic ammonium cation and water and having a composition, in terms of mole ratios of oxides, falling within the following ranges:

| | |
|---|---|
| $M^+/SiO_2$ | = 0.01–0.50 |
| $OH^-/SiO_2$ | = 0.01–0.30 |
| $H_2O/SiO_2$ | = 20–120 |
| $Q/SiO_2$ | = 0.10–1.00 | wherein Q is a quaternary organic ammonium cation, and $M^+$ is an alkali metal ion not supplied by the magadiite, and maintaining said mixture at crystallization temperature until said crystals are formed.

DETAILED DESCRIPTION

Magadiite is a natural or synthetic sodium silicate hydrate with a layered structure having a composition approximating to $Na_2Si_{14}O_{29}.11H_2O$. Natural magadiite may be obtained from lake beds at Lake Magadi, Kenya and has an X-ray diffraction pattern as described by Engster, H. P., Hydrous Sodium Silicates from Lake Magadi, Kenya; Precursors of Bedded Chert., Science, 157, 1177–1180 (1967) which is incorporated herein by reference. Synthetic magadiite is prepared from methods known in the art, for example Logaly, G. and Beneke, K., American Minerologist 60, 642–649, 1975, as well as by a novel method described hereinbelow. The hydrogen form of magadiite may be prepared by methods described by Logaly, G. and Beneke, K., American Minerologist 60, 650–658, 1975.

A preferred method of preparing synthetic magadiite which is aluminum free comprises preparing a mixture containing an alkali metal hydroxide, a source of silica dioxide, water and as a promoter, a lower alkyl substituted urea or a lower alkyl substituted amide and mixtures thereof and having a composition in terms of mole ratios of oxides falling within the following ranges:

| | Broad | Narrow |
|---|---|---|
| $OH^-/SiO_2$ | 0.25 to 0.8 | 0.55 to 0.65 |
| promoter/$SiO_2$ | 0.05 to 0.5 | 0.1 to 0.2 |
| $H_2O/SiO_2$ | at least 30:1 | | and maintaining said mixture under crystallization conditions until crystals of said magadiite are formed.

Typical silicon oxide sources in preparing magadiite include silicates, silica hydrogel, silica acid, colloidal silica, etc. The sodium hydroxide is the preferred alkali metal hydroxide. Temperatures for the process range from about 100° C. to about 175° C. and preferably 130° C. to 160° C., and crystallization times range from about 50 to 150 hours. Preferably, the hydrothermal crystallization is performed under pressure in an autoclave or static bomb reactor so that the reaction mixture is subject to autogenous pressure. The alkali metal form of magadiite, e.g., Na-magadiite may be converted to H-magadiite by treating the Na-magadiite with an acidic material such as aqueous hydrochloric acid.

Prior art synthetic methods, without the presence of the lower alkyl substituted urea or lower alkyl substituted amide promoters, would take considerably longer to obtain crystalline product.

Preferably, the lower alkyl substituted urea has the formula:

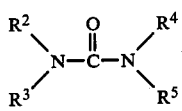

where $R^2$ and $R^3$ are the same of different and each is H, lower alkyl of 1 to 5 carbon atoms or $R^2$ and $R^3$ together with the nitrogen to which they are attached form an alkylene group containing 4 to 7 carbon atoms which may be interrupted by O, S or N atoms; $R^4$ and $R^5$ are the same or different and each is H, lower alkyl or 1 to 5 carbon atoms or $R^4$ and $R^5$ together with the nitrogen to which they are attached form an alkylene group containing 4 to 7 carbon atoms which may be interrupted by an O, S or N atom, with the proviso that $R^2$, $R^3$, $R^4$ and $R^5$ cannot all be hydrogen at the same time; and the lower alkyl substituted amide has the formula:

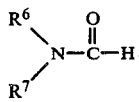

wherein $R^6$ and $R^7$ are H or lower alkyl containing 1 to 5 carbon atoms or $R^6$ and $R^7$ together with the nitrogen to which they are attached form an alkylene group containing 4 to 7 carbon atoms which may be interrupted by an O, S. or N atom with the proviso that $R^6$ and $R^7$ cannot be hydrogen at the same time.

Particularly preferred crystalline organosilicates which can be prepared in accordance with the present invention are those of the ZSM-5 type and various other materials. ZSM-5 type zeolites are exemplified by ZSM-5, ZSM-12, ZSM-35, ZSM-39, and ZSM-48 and other similar materials. U.S. Pat. No. 3,702,886 describes and claims ZSM-5.

ZSM-11 is more particularly described in U.S. Pat. No. 3,709,979.

ZSM-12 is more particularly described in U.S. Pat. No. 3,832,449.

ZSM-35 is more particularly described in U.S. Pat. Nos. 4,016,245 and 4,017,195.

ZSM-39 is more particularly described in U.S. Pat. No. 4,259,306.

ZSM-48 is more particularly described in U.S. Pat. Nos. 4,375,573 and 4,423,021.

Other crystalline organosilicates prepared in accordance to the present invention are the EU-2 (Great Britain No. 2,077,709A), FU-1 (U.S. Pat. No. 4,209,498) and SSZ-15 (copending U.S. application Ser. No. 437,709, now U.S. Pat. No. 4,610,854) type. Each of the above-identified patents and applications are incorporated herein by reference. New zeolite structures may result as well by the present method.

It is to be understood that by incorporating by reference the foregoing patents to describe examples of specific members of the novel class with greater particularity, it is intended that identification of the therein disclosed crystalline zeolites be resolved on the basis of their respective X-ray diffraction patterns. As discussed above, the present invention contemplates preparation of such catalysts which are free of aluminum. The incorporation of the identified patents should therefore not be construed as limiting the disclosed crystalline zeolites to those having the specific alumina-silica mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The use of magadiite as a source of silica in the reaction mixture allows production of high purity crystalline silicate molecular sieves or zeolites. Due to the relatively low solubility of magadiite, the crystalline organosilicates form relatively slowly, which allows for crystallite formation of significantly greater dimensions than those obtained using normal or prior art zeolite preparations. Also, the crystals formed generally have a more perfect form with fewer dislocations and crystalline disorder.

The use of magadiite also allows a relatively smaller concentration of alkali metal hydroxide to be present in the reaction mixture. Because one can use lower amounts of alkali metal hydroxide and because magadiite may be used in the hydrogen form as well as the alkali metal form and preferably the sodium form or as mixtures thereof, lower alkali metal containing crystalline zeolites may be obtained.

While not intending to be limited by theory, it is believed that magadiite may contain within its structure the correct pentasil building units found in the framework structure of a number of high silica zeolites. By breaking relatively few bonds in the magadiite structure, and in the presence of quaternary organic ammonium cations, the layered silicate can be converted into a three dimensional zeolite structure.

The zeolite can be suitably prepared from an aqueous solution containing sources of an alkali metal oxide and a quaternary organic ammonium cation and magadiite or the hydrogen form of magadiite or mixtures thereof as a source of aluminum free oxide of silicon. The reaction mixture should have a composition in terms of mole ratios of oxides falling within the following ranges:

|  | Narrow | Broad |
|---|---|---|
| $M^+/SiO_2$ | 0.01–0.1 | 0.01–0.50 |
| $OH^-/SiO_2$ | 0.01–0.05 | 0.01–0.30 |
| $H_2O/SiO_2$ | 30–50 | 20–120 |
| $Q/SiO_2$ | 0.2 to 0.6 | 0.10–1.00 | wherein Q is a quaternary organic ammonium cation, $M^+$ is an alkali metal not supplied by the magadiite, preferably sodium or potassium.

The organic component of the crystallization mixture which acts as a template during crystallization and from which Q is derived, is an organic quaternary ammonium compound and includes those having the following formulas:

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 6 carbon atoms, cycloheteroalkyl of from 3 to 6 carbon atoms or combinations thereof; X is an anion, e.g., fluoride, chloride, bromide, iodide, hydroxide, acetate, sulfate, carboxylate, etc. The anion is one which is not detrimental to the formation of the zeolite.

Non-limiting examples of these type of compounds include salts of tetramethylammonium, tetraethylammonium, tetrapropylammonium, tetrabutylammonium, dibenzyldiethylammonium, benzyltrimethylammonium, trimethylcyclopentylammonium, trimethylfurfurylammonium, dimethylethylcyclopentylammonium, ethyltrimethylammonium and chlorine bromine or iodine, or

wherein R' is a hydrocarbon group containing 3 to 10 carbon atoms which is attached to the $N^+$ and forms an alicyclic, heterolicyclic or heteroaromatic structure and X is as defined above. Such structures may be, as non-limiting examples:

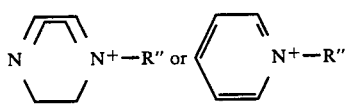

wherein R" is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms;

or compounds containing multiple cationic centers which include those having the formula:

$$[(R)_3N^+(Z)_nN^+(R)_3](X^-)_2$$

or $$[R'N^+(Z)_nN^+R'](X^-)_2$$

wherein R, R' and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$$[(CH_3)_3N^+(CH_2)_6N^+(CH_3)_3](Cl^-)_2,$$

$$[(C_3H_7)_3N^+(CH_2)_{10}N^+(C_3H_7)_3](Cl^-)_2,$$

$$[(C_6H_5)_3N^+(C_2H_4)_{16}N^+(C_6H_5)_3](OH^-)_2,$$

$$[(C_{18}H_{37})_3N^+(C_2H_2)_3N^+(CH_3)_3](Cl^-)_2,$$

$$[(C_2H_5)_3N^+(C_6H_4)N^+(C_2H_5)_3](Br^-)_2,$$

$$[(C_2H_3)_3N^+(CH_2)_{50}N^+(C_2H_3)_3](OH^-)_2,$$

$$[(CH_3)_3N^+(CH_2)_6N^+(CH_3)_3](Cl^-)_2.$$

The reaction mixture is prepared using standard zeolitic preparation techniques.

The reaction mixture is maintained at an elevated temperature until the crystals of the zeolite are formed. The temperatures during the hydrothermal crystallization step are typically maintained from about 100° C. to about 250° C., preferably from about 120° C. to about 200° C. and most preferably from about 130° C. to about 165° C. The crystallization period is typically from about 1 to about 7 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, zeolite crystals. The drying step can be performed at atmospheric or subatmospheric pressures.

As in the case of the crystalline organosilicates referenced previously, the organic quaternary amine cation moiety is quite readily thermally decomposed and removed from the zeolite by calcination in an oxidizing atmosphere (air) or inert atmosphere at temperatures of from about 480° F. to 1500° F. The residual alkali metal in the product can be removed by washing with alkali metal halide solution or an aqueous acid solution such as hydrochloric acid.

The crystalline silicates obtained by the method of this invention are suitable for use in all the absorption and catalyst applications in which the above-referenced high or all silica zeolites can be employed, i.e., U.S. Pat. Nos. 3,941,871; 4,061,724; 4,073,865; 4,104,294; and 4,456,582 which references are incorporated herein by reference.

EXAMPLES

Example 1

Preparation of a Synthetic Magadiite

A solution is formed from mixing 6 g of N,N,N'N'tetramethylurea (Burdick and Jackson), 42.14 g of Banco sodium silicate solution (29.22 wt % $SiO_2$, 9.08% $Na_2O$), 0.80 g of concentrated sodium hydroxide solution (50% w/w), and 193 ml of water. There is no gelation or precipitation. The contents are loaded into a Teflon-lined stainless steel cannister or reactor designed to operate under pressure. The cannister or reactor is heated at 140° C. for seven days without agitation. Upon cooling the reactor, the contents are poured into a filter and the precipitated solids are washed several times with water and then air-dried. The product has the X-ray diffraction pattern shown in Table I.

TABLE I

| 2θ | d/n | Relative Int. |
|---|---|---|
| 5.71 | 15.48 | 72 |
| 11.44 | 7.73 | 5 |
| 12.20 | 7.25 | 1 |
| 17.15 | 5.17 | 7 |
| 17.70 | 5.01 | 2 |
| 19.82 | 4.48 | 3 |
| 22.12 | 4.02 | 1 |
| 24.45 | 3.641 | 5 |
| 25.02 | 3.559 | 8 |
| 25.82 | 3.450 | 28 |
| 26.93 | 3.311 | 16 |
| 28.29 | 3.155 | 23 |
| 29.80 | 2.998 | 1 |

Example 2

Synthesis of SSZ-15 Zeolite from Magadiite

A solution was prepared comprising 1.55 g of magadiite (as prepared in Example 1), 2.0 gm of N,N,N trimethylcyclopentyl ammonium iodide (referred to as Template A and listed in Table IV below), 15 ml $H_2O$, and 0.20 gm of concentrated NaOH. The contents are mixed in a Teflon-lined stainless steel reactor and heated at 200° C. for three days. The product is recovered by filtration and dried after several washings. The X-ray diffraction pattern of the all-silica SSZ-15 zeolite is given in Table II and conforms to that given in U.S. application Ser. No. 437,709, now U.S. Pat. No. 4,610,854.

TABLE II

| 2θ | d/n | Relative Int. |
|---|---|---|
| 4.45 | 19.86 | 3 |
| 8.06 | 10.97 | 7 |
| 9.67 | 9.15 | 19 |
| 11.75 | 7.53 | 3 |

TABLE II-continued

| 2θ | d/n | Relative Int. |
|---|---|---|
| 13.00 | 6.81 | 2 |
| 14.88 | 5.95 | 1 |
| 15.31 | 5.79 | 2 |
| 19.24 | 4.61 | 47 |
| 19.92 | 4.46 | 16 |
| 20.70 | 4.29 | 77 |
| 21.72 | 4.09 | 6 |
| 22.37 | 3.974 | 34 |
| 23.65 | 3.76 | 7 |
| 24.15 | 3.685 | 10 |
| 24.91 | 3.574 | 18 |
| 26.11 | 3.413 | 5 |
| 26.72 | 3.336 | 15 |
| 26.97 | 3.306 | 2 |
| 27.33 | 3.263 | 20 |
| 27.62 | 3.230 | 7 |
| 28.75 | 3.105 | 3 |
| 29.09 | 3.070 | 3 |
| 29.87 | 2.99 | 3 |

Using the general procedure outlined above, various zeolites were prepared as shown in Table III.

The templates used in Examples 3 through 17 are specifically described in Table IV.

TABLE III

| Example No. | Template | Template g | g. Magadiite | Conc. NaOH, g | $H_2O$, ml | Time | Temp. | Phases as Determined by X-Ray Analysis |
|---|---|---|---|---|---|---|---|---|
| 3 | B | 2.00 | 1.50 | 0.20 | 15 | 3 Days | 200° C. | ZSM-5 |
| 4 | C | 1.60 | 1.50 | 0.20 | 15 | 3 Days | 200° C. | 25% ZSM-5 |
| 5 | D | 0.77 | 1.00 | 0.13 | 10 | 3 Days | 200° C. | Only 5% ZSM-5 |
| 6 | A | 1.33 | 1.03 | 0.13 | 10 | 3 Days | 150° C. | SSZ-15 |
| 7 | None | 0.00 | 1.50 | 0.20 | 15 | 3 Days | 200° C. | 100% Quartz |
| 8 | E | 2.00 | 1.50 | 0.20 | 15 | 3 Days | 200° C. | ZSM-12 |
| 9 | F | 2.00 | 1.50 | 0.20 | 15 | 3 Days | 200° C. | 60% EU-2 |
| 10 | G | 0.50 | 1.50 | 0.20 | 15 | 3 Days | 200° C. | 100% Quartz |
| 11 | A | 2.00 | 1.50 | 0.20 | 15 | 3 Days | 160° C. | Trace SSZ-15 |
| 12 | H | 1.50 | 1.50 | 0.20 | 15 | 3 Days | 180° C. | ZSM-48 |
| 13 | I | 0.51 | 0.50 | 0.08 | 5 | 3 Days | 180° C. | ZSM-12 |
| 14 | D | 2.00 | 1.50 | 0.04 | 15 | 1 Day | 230° C. | ZSM-39 |
| 15 | B | 1.22 | 0.90 | 0.12 | 9 | 6 Hr | 195° C. | ZSM-5+Magadiite |
| 16 | B | 2.01 | 1.53 | .01 | 14 | 1 Day | 230° C. | ZSM-5 |
| 17 | J | 2.00 | 1.50 | 0.04 | 15 | 1 Day | 230° C. | 20% FU-1 |

TABLE IV

| Designation | Name | Organic Cation Structure |
|---|---|---|
| A | N,N,N Trimethyl-cyclopentyl-ammonium | cyclopentyl—$N^+(CH_3)_3$ $I^\ominus$ |
| B | Tetrapropyl-ammonium (TPA) | $(CH_3CH_2CH_2)_4N^+$ $Br^\ominus$ |
| C | Tetraethyl-ammonium (TEA) | $(CH_3CH_2)_4N^+$ $Br^\ominus$ |
| D | Tetramethyl-ammonium (TMA) | $(CH_3)_4N^+$ $Br^\ominus$ |
| E | Bis 1,4 diquinu-clidinium butane | quinuclidine—$N^+$—$(CH_2)_4$—$N^+$—quinuclidine $2\,Br^\ominus$ |
| F | Hexamethonium | $(CH_3)_3N^+$—$(CH_2)_6$—$N^+(CH_3)_3$ $2\,Br^\ominus$ |
| G | Pyrrolidine | pyrrolidine (N—H) |
| H | N,N,N Trimethyl-furfuryl-ammonium | cyclopentyl—$CH_2$—$N^+(CH_3)_3$ $I^\ominus$ |
| I | N,N,N Dimethyl, ethylcyclopentyl-ammonium | cyclopentyl—$N^+(CH_3)_2(CH_2CH_3)$ $I^\ominus$ |
| J | Ethyl trimethyl-ammonium | $CH_3CH_2$—$N^+(CH_3)_3$ $I^\ominus$ |

The X-ray powder diffraction patterns for the magadiite of Example 1 and prepared zeolites were determined using standard techniques. The radiation was K-alpha/doublet of copper and a scintillation counter spectrometer with a strip-chart pen recorder was used. The peak heights I and the positions as a function of 2θ, where θ is the Bragg angle, were read from the spectrometer chart. From these measured values, the relative intensities, $100\,I/I_o$, where $I_o$ is the intensity of the strongest line or peak, and d, the interplanar spacing in Angstroms corresponding to the recorded lines, can be calculated. The X-ray diffraction pattern obtained for the product corresponded with the known pattern for each of the indicated zeolites.

Example 10 demonstrates that the use of a basic amine without quaternization of the nitrogen leads essentially to no zeolite formation. Quartz alone is formed as though there were no template at all (Example 7).

In the case for the preparation of the zeolites, for example, SSZ-15, ZSM-5 and ZSM-39 it was noted that using the methods of this invention allows for crystallite formation of significantly greater dimensions than that obtained according to prior art zeolite preparation.

What is claimed is:

1. A method of preparing crystalline microporous organosilicates which comprises preparing an aluminum free reaction mixture containing as a source of silica oxide an aluminum free magadiite or hydrogen form of magadiite, an alkali metal oxide, a quaternary organic ammonium cation and water and having a composition, in terms of mole ratios of oxides, falling within the following ranges:

| | |
|---|---|
| M+/SiO2 | = 0.01–0.50 |
| OH−/SiO2 | = 0.01–0.30 |
| H2O/SiO2 | = 20–120 |
| Q/SiO2 | = 0.10–1.00 | wherein Q is a quaternary organic ammonium cation, and M+ is an alkali metal ion not supplied by the magadiite, and maintaining said mixture at crystallization temperature until said crystals are formed.

2. The method of claim 1 which contains an additional step of calcining the crystalline organosilicates formed at a temperature of from 480° F. to 1500° F.

3. The method of claim 1 wherein the temperature is maintained between about 100° C. to 250° C.

4. The method of claim 1 wherein M is sodium.

5. The method of claim 1 wherein the quaternary organic ammonium cation is derived from compounds having the formula:

R4N+X−  

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 6 carbon atoms, cycloheteroalkyl of from 3 to 6 carbon atoms or combinations thereof; and X is an anion.

6. The method of claim 1 wherein the quaternary organic ammonium cation is derived from compounds having the formula:

R'N+X−  

wherein R' is a hydrocarbon group containing 3 to 10 carbon atoms which is attached to the N+ and forms an alicyclic, heterocyclic or heteroaromatic structure; and X is an anion.

7. The method of claim 1 wherein the quaternary organic ammonium cation is derived from compounds having the formula:

[(R)3N+(Z)nN+(R)3](X−)2  

or

[R'N+(Z)nN+R'](X−)2  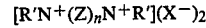

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 6 carbon atoms, cycloheteroalkyl of from 3 to 6 carbon atoms; R' is a hydrocarbon group containing 3 to 10 carbon atoms which is attached to the N+ and forms an alicyclic, heterocyclic or heteroaromatic structure; X is an anion; Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50.

8. The method of claim 1 wherein the aluminum free magadiite is prepared by a method which comprises preparing a mixture containing an alkali metal hydroxide, a source of silica dioxide, water and as a promoter, a lower alkyl substituted urea or a lower dialkyl substituted amide or mixtures thereof and having a composition in terms of mole ratios of oxides falling within the following ranges:

| | |
|---|---|
| OH−/SiO2 = | 0.25 to 0.8 |
| promoter/SiO2 = | 0.05 to 0.5 |
| H2O/SiO2 = | at least 30:1 | and maintaining said mixture under crystallization conditions until crystals of said magadiite are formed.

9. The method of claim 8 wherein the lower alkyl substituted urea has the formula:

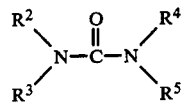

wherein R2 and R3 are the same or different and each is H, lower alkyl of 1 to 5 carbon atoms or R2 and R3 together with the nitrogen to which they are attached form an alkylene group containing 4 to 7 carbon atoms which may be interrupted by O, S or N atoms; R4 and R5 are the same or different and each is H, lower alkyl of 1 to 5 carbon atoms or R4 and R5 together with the nitrogen to which they are attached form an alkylene group containing 4 to 7 carbon atoms which may be interrupted by an O, S or N atom, with the proviso that R2, R3, R4 and R5 cannot all be hydrogen at the same time.

10. The method of claim 8 wherein the lower alkyl substituted amide has the formula:

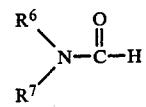

wherein R6 and R7 is N or lower alkyl containing 1 to 5 carbon atoms or R6 or R7 together with the nitrogen to which they are attached form an alkylene group containing 4 to 7 carbon atoms which may be interrupted by an O, S or N atom, with the proviso that R6 and R7 cannot be hydrogen at the same time.

11. A method of preparing crystalline microporous organosilicates selected from the group consisting of ZSM-5, ZSM-12, ZSM-39, ZSM-48, SSZ-15, EU-2, and FU-1, which comprises preparing an aluminum-free reaction mixture containing as a source of silica oxide an aluminum-free magadiite or hydrogen form of magadiite, an alkali metal oxide, a quaternary organic ammonium cation and water and having a composition, in terms of mole ratios of oxides, falling within the following ranges:

| | |
|---|---|
| M+/SiO2 | = 0.01–0.50 |
| OH−/SiO2 | = 0.01–0.30 |
| H2O/SiO2 | = 20–120 |
| Q/SiO2 | = 0.10–1.00 | wherein Q is a quaternary organic ammonium cation, and M+ is an alkali metal ion not supplied by the magadiite, and maintaining said mixture at crystallization temperature until said crystals are formed.

* * * * *